INVENTOR
HEYNO VON MUNCHHAUSEN

July 28, 1964   H. VON MUNCHHAUSEN   3,142,096
ACOUSTICAL SLIDING PARTITION AND SLIDING TRACKS FOR THE SAME
Filed July 25, 1962   8 Sheets-Sheet 2

INVENTOR
HEYNO VON MUNCHHAUSEN
BY Richard J. Rewling
ATTORNEY

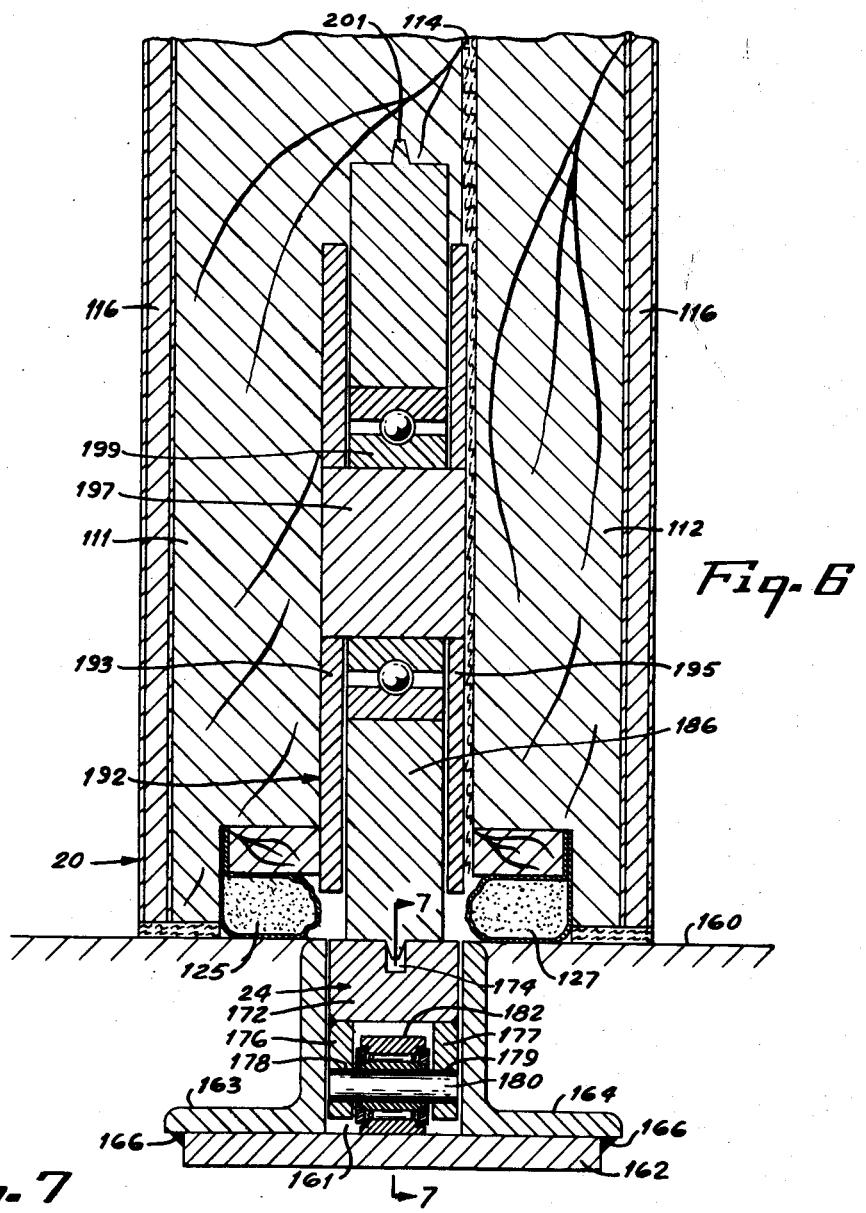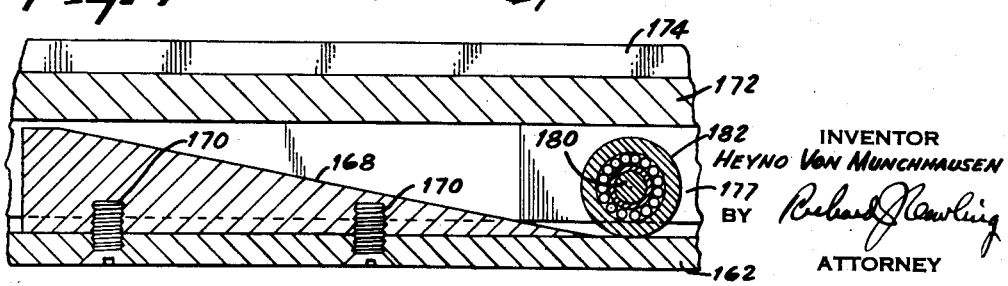

INVENTOR
HEYNO VON MUNCHHAUSEN

INVENTOR
HEYNO VON MUNCHHAUSEN
BY Richard J Rawling
ATTORNEY

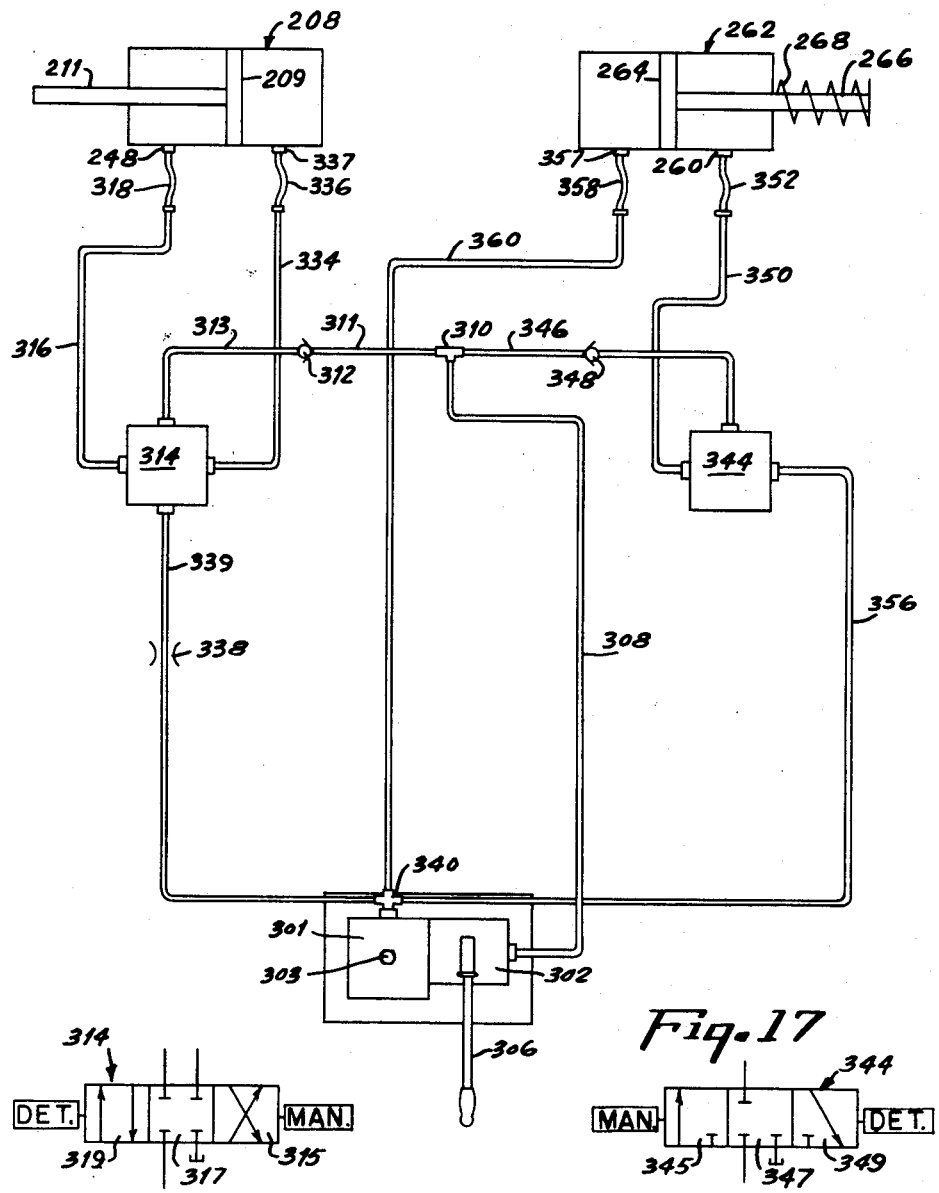

July 28, 1964  H. VON MUNCHHAUSEN  3,142,096
ACOUSTICAL SLIDING PARTITION AND SLIDING TRACKS FOR THE SAME
Filed July 25, 1962  8 Sheets-Sheet 7

INVENTOR
HEYNO VON MUNCHHAUSEN
BY
ATTORNEY

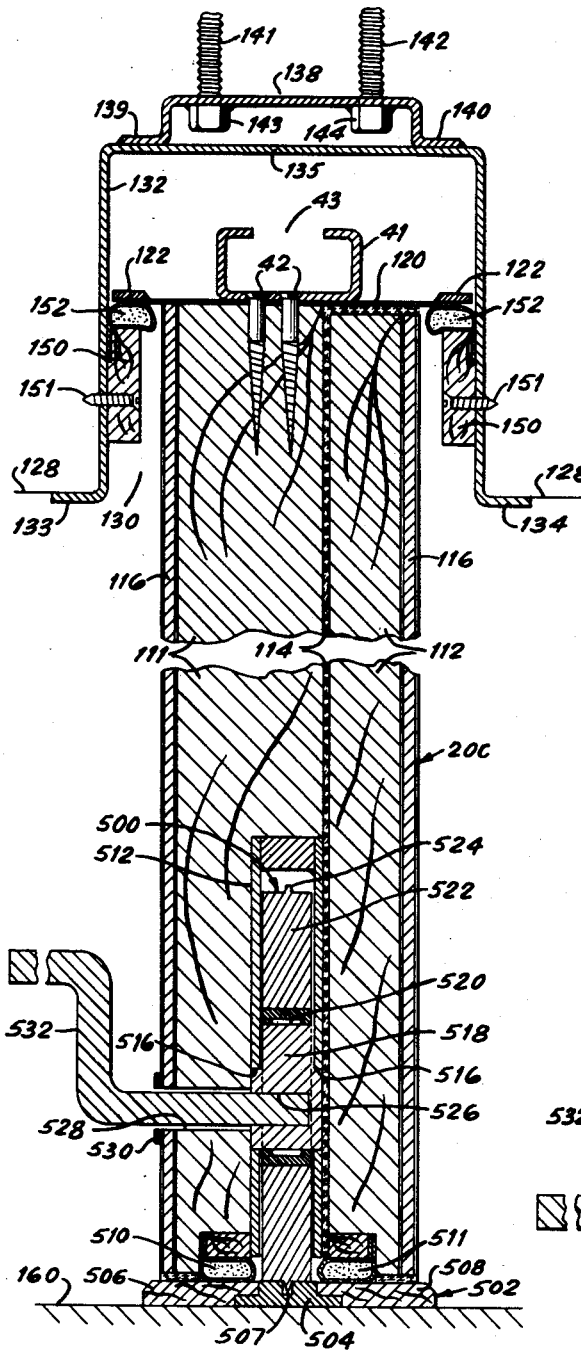
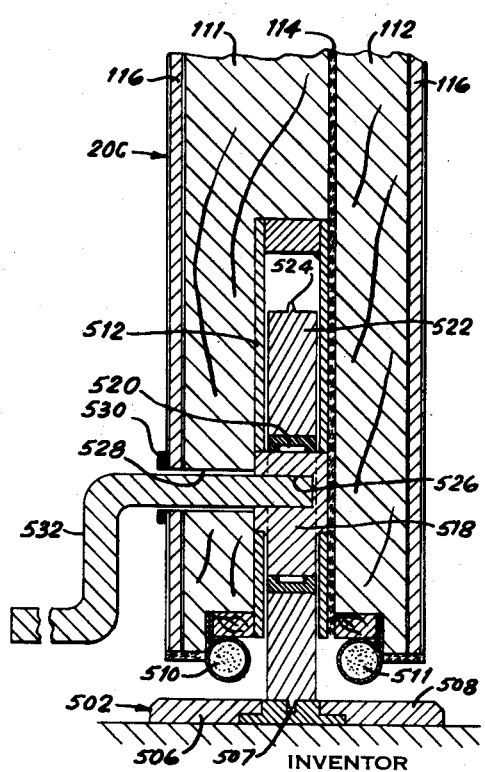

United States Patent Office 3,142,096
Patented July 28, 1964

3,142,096
ACOUSTICAL SLIDING PARTITION AND SLIDING TRACKS FOR THE SAME
Heyno Von Munchhausen, 290 Riverside Drive, New York 25, N.Y.
Filed July 25, 1962, Ser. No. 212,394
7 Claims. (Cl. 20—19)

The present invention relates generally to sliding acoustical partitions of the type used in the temporary subdivision of a large room, and it has particular relation to making the movement of such partitions easy and the sealing thereof acoustically very effective.

Heretofore, early sliding partitions were generally of the accordion or folding type in which the several sections were suitably hinged together, making movement into place exceedingly difficult since all sections had to be moved at once. Such partitions traveled along a track on the floor or in the ceiling, and, as each panel approached its position, it had to be pivoted or zig-zagged into its final position.

A later improvement consisted of a series of sliding partition panel sections which were not hinged, and each panel section was pushed individually into position. It was exceedingly difficult, if not impossible, to secure these panels together acoustically, especially along their top and bottom edges, since any sealing means would offer frictional resistance to their sliding movement.

With the present invention all of the aforesaid disadvantages and difficulties have been obviated, and there is provided a simple, efficient and economical arrangement whereby the individual panel sections are very easy to move into position, and, when the entire partition is set up, it is very simple to seal acoustically along their top and bottom edges.

With the present invention, the individual panel sections of the partition may be stored easily and conveniently in an off-set chamber or room, especially equipped with a "changer-rack," whereby they may be suspended from their top edges and moved into storage in a side-by-side arrangement. When it is desired to move the panel sections into partitioning position, each is separately moved out into alignment with a floor storage trackway and positioned thereon, whereupon they may be easily and quickly moved onto the main room divider trackway and placed into their respective partitioning position. When the individual panel sections are in their final position, the main room divider trackway with the panel sections thereon may be lowered to cause the entire partition to be lowered into an acoustically sealing position along both their top and bottom edges. There is also provided a novel arrangement whereby the respective end sections of the assembled partition may be acoustically sealed along the outer side edges. When completely locked in partitioning position, each of the individual panel sections are sealed along all four sides.

An object of the present invention is to provide a novel, slidable partition, which is of a simple, durable, economical and efficient construction, wherein the individual panel sections are easy to move into their partitioning position, or storage, and easy to drop into acoustical sealing position along their top and bottom edges.

Another object of the invention is the provision of an efficient, economical and convenient arrangement for storing the individual panel sections, which comprises moving them along a floor trackway, into storage, raising the room floor trackway to raise the individual panel sections to disengage them from their acoustical seals and then moving them into storage in a side-by-side relationship.

A further object of the invention is to provide an efficient, economical and durable trackway that remains flush with a floor when not in use for moving the panel sections therealong, but which may be easily and quickly raised to permit the panel sections to travel, or to be lowered to render said panel sections immovable and acoustically sealed along both their top and bottom edges.

Another object of the invention is the provision of simple, economical and efficient means for sealing the side edges of the panels acoustically after they have been moved into their partitioning position.

A further object of the invention is to provide a novel, efficient and economical means for acoustically sealing the top edges of the panel sections after the partition has been moved into position.

Another object of the invention is to provide a simple, economical and efficient pivotal astragal for sealing acoustically the side edges of the panel sections after all of the panel sections have been placed in their final position.

A further object of the invention is the provision of a simple, economical and efficient ceiling housing which has been provided with acoustical seals for sealing the top edges of the individual panel sections.

Another object of the invention is to provide retractable rollable means in the bottom edge of the individual panel sections which may be actuated to permit said panel sections to be lowered for acoustical sealing and/or raised to permit easy sliding along a fixed trackway.

Other and further objects and advantages of the invention reside in the detailed construction of the several parts, which result in simplicity, economy and efficiency, and which will be apparent from the following description, wherein two preferred embodiments are shown, reference being had to the accompanying drawings, forming a part hereof, wherein like numerals indicate like parts, in which:

FIGURE 6 is a fragmentary enlarged sectional view of the main floor trackway in its lowermost or sealing-position, showing also the bottom of the partition and its sealing means in acoustical position;

FIGURE 7 is a fragmentary longitudinal sectional view of one of the ramps of the floor trackways by means of which the trackways and their supported partitions may be raised and/or lowered, the same having been taken substantially along the line 7—7 of FIGURE 6, looking in the direction of the arrows;

FIGURE 15 is a schematic view of the hydraulic actuating systems that operate the actuating means for both the main floor trackway and the storage chamber trackway;

FIGURE 16 is a diagrammatic view of the four-way control valve which controls the operation of the hydraulic system for the main floor trackway;

FIGURE 17 is a diagrammatic view of the three-way control valve which controls the operation of the hydraulic system for the storage chamber trackway;

FIGURE 20 is a fragmentary vertical sectional view of a modified panel section, which is provided with retractable supporting wheels for operating over a fixed trackway on a floor, the same being shown in retracted position with the bottom edge of the panel section in acoustical sealing position; and FIGURE 21 is a fragmentary vertical sectional view of the modified panel section shown in FIGURE 20, but illustrating the position of the panel sections when the supporting wheels are projected for movement along said floor trackway.

*The Storage Chamber and Changer-Rack*

Figure 2:
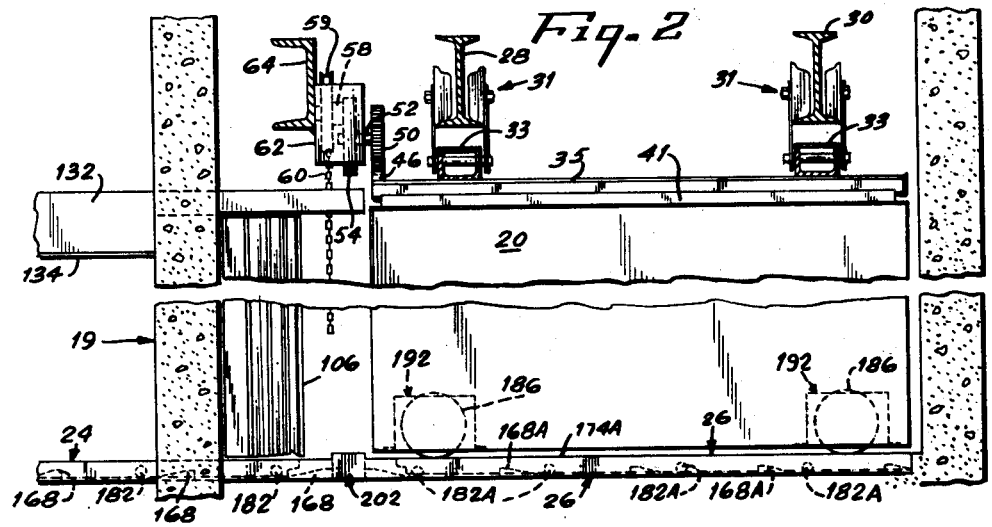
FIGURE 2 is a fragmentary side elevational view of the storage chamber and "changer-rack" shown in FIGURE 1.
Figure 1:
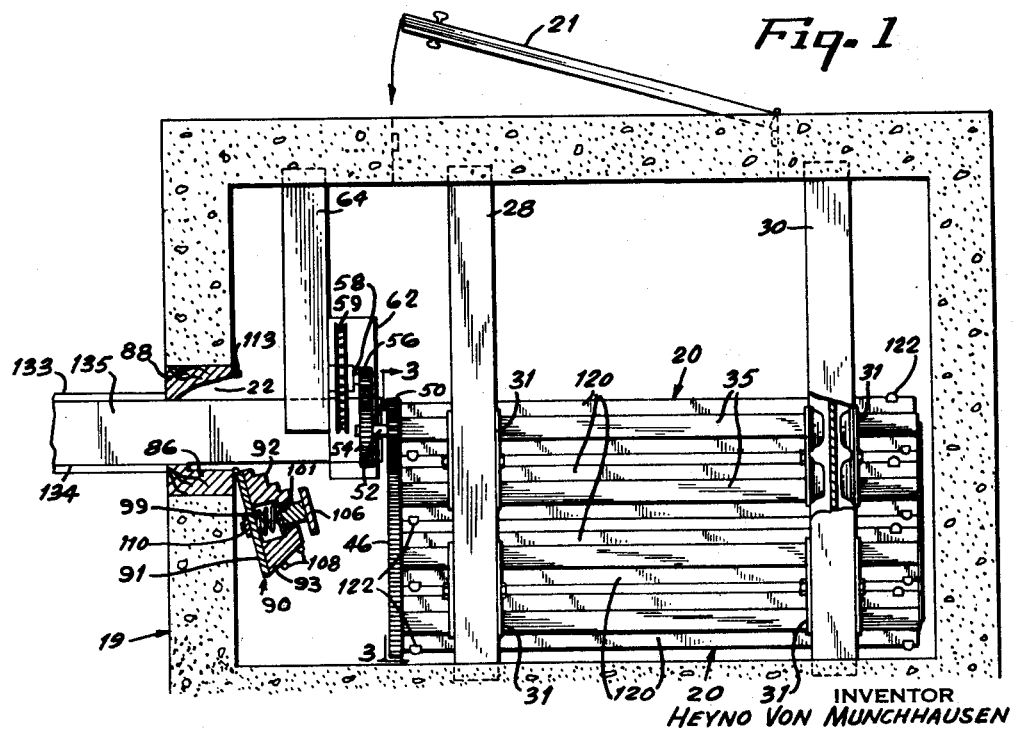
FIGURE 1 is a top plan view of a storage chamber and its "changer-rack," showing individual panel sections suspended by channel members mounted on their top edges within said chamber in a side-by-side arrangement.
Figure 3:
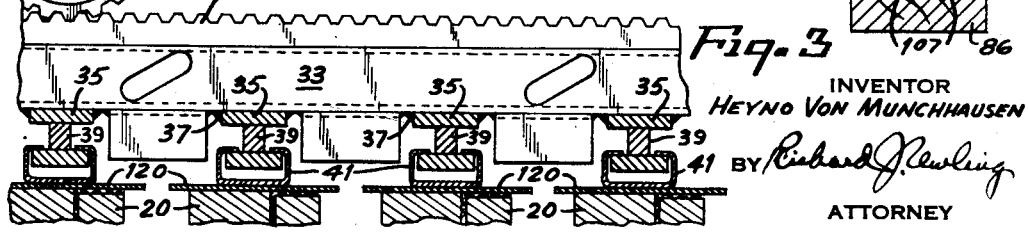
FIGURE 3 is an enlarged cross-sectional view of the "changer-rack" shown in FIGURE 1, the same having been taken substantially along the line 3—3 thereof, looking in the direction of the arrows.
Figure 8:
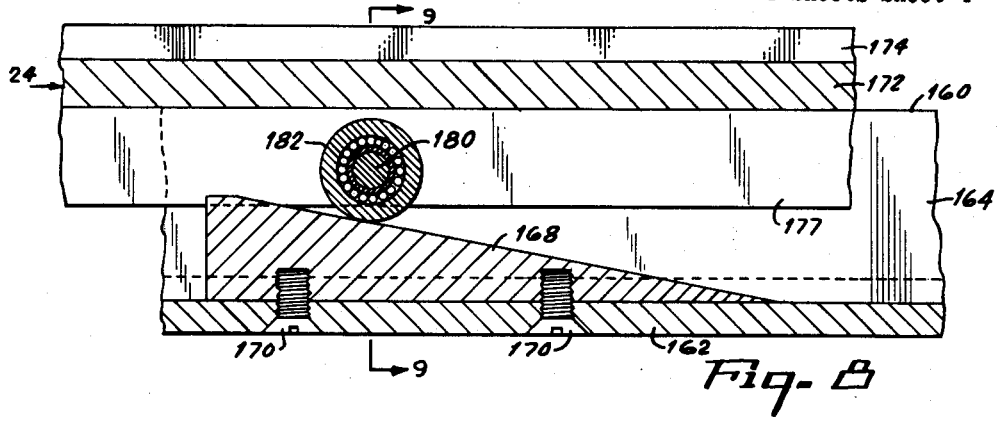
FIGURE 8 is a fragmentary longitudinal vertical sectional view, on an enlarged scale, of the main floor trackway, showing the same in a raised position.
Figure 9:
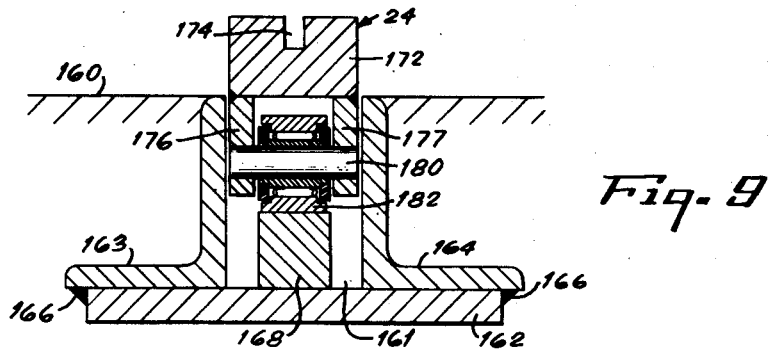
FIGURE 9 is a sectional view of the trackway shown in FIGURE 8, the same having been taken substantially along the line 9—9 thereof, looking in the direction of the arrows.

Referring now to the drawings and particularly FIGURES 1, 2 and 3, there is shown a small storage room or chamber 19, which is of a size sufficient to store all of the panel sections 20 required for the sliding partition. However, if the partition is exceedingly long, requiring a great number of panel sections, an identical storage chamber may be built on the opposite side of the storage chamber trackway, and the changer-rack can be constructed to operate on both sides of said trackway. Only one such chamber 19 is shown herein to illustrate the principles of the invention.

The storage chamber 19 is shown as being formed of concrete, but any other suitable building materials may be used. The chamber 19 is provided with a conventional entrance door 21 through which access may be had for installation, maintenance and repair. A vertical slot or opening 22 is provided along the side adjacent the room to be subdivided in alignment with a floor trackway 24 extending across such room. The slot or opening 22 is just wide and high enough to slide a panel section therethrough. The storage chamber 19 has a floor trackway 26 extending longitudinally thereof, which is in longitudinal alignment with the main floor trackway 24 running across the room to be partitioned.

Mounted adjacent the top of the chamber 19 and slightly above the tops of the panel sections 20 to be stored therein are spaced I-beams 28 and 30, whose opposite ends are suitably anchored in the respective sidewalls of said chamber 19 in any conventional manner. Each I-beam 28 and 30 has a series of freely movable roller hangers 31 suspended therefrom, which, in turn, have depending therebelow a tubular bar 33 extending in vertical alignment with the I-beam 28 and 30. Referring now to FIGURE 3, it will be noted that the tubular bars 33 are connected transversely by a series of flat bars 35, which are welded, as indicated at 37. The bars 35 correspond in number to the number of panel sections to be stored within the chamber 19. Each bar 35 has an inverted T-shaped bar 39 welded or otherwise fixedly suspended therefrom, which is adapted to receive a slidable split hanger member 41 mounted along the top side of each panel section 20 of the sliding partition by screws 42. (See FIG. 5.) It will be noted that the hanger members 41 each have a medial slot extending the full length of its top side, as indicated at 43, which provides clearance for the stem of the inverted T-bars 39, as best shown in FIGURE 3.

A gear rack 46 extends across the tops of the flat bars 35 adjacent one end, and is engaged by a pinion 50, which is mounted fixedly on the projecting end of a shaft 52. The opposite end of the shaft 52 has a large gear 54 keyed thereto, which, in turn, enmeshes with another pinion gear 56 that is keyed to a shaft 58. The shaft 58 has a sprocket wheel 59 keyed thereto, which is engaged by a chain 60 for manual manipulation. By pulling the chain 60 in one direction, the panel sections 20, which are suspended by their hanger members 41 on their respective T-bars 39, may be moved one at a time into alignment with the storage chamber floor trackway 26. By pulling the chain 60 in the opposite direction, it will, of course, move the inverted T-bars 39 away from the trackway 26 and into storage. The entire operating mechanism is mounted within a housing 62, which is welded to a supporting structural U-shaped beam 64 in any conventional manner. The details of construction of this mechanism forms no part of the present invention, and it is believed to be so simple and conventional that it will not be necessary or essential to describe its several parts in greater detail for a complete understanding of the operation.

*The Sliding Partition*

Figure 4:
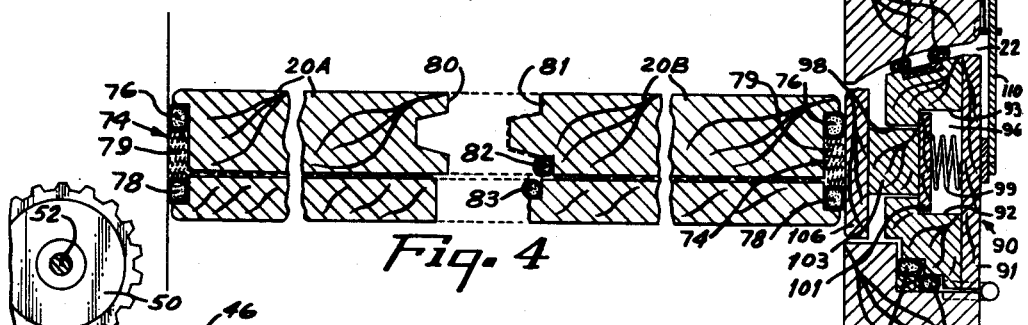
FIGURE 4 is a cross-sectional view of a partition, consisting of a plurality of panel sections made in accordance with the present invention, with the middle panel sections being shown separated slightly, to better illustrate the manner in which the vertical side edges between adjacent panel sections are sealed acoustically.

There is shown in FIGURE 4 a partition consisting of but two panel sections 20A and 20B. It will be noted that the opposite ends or vertical edges of the assembled partition each has an acoustical seal 74 consisting of two spaced annular sealing strips 76 and 78 secured in any suitable manner to their respective panel sections. The space between said sealing strips 76 and 78 is suitably filled with a felt or other similar sound-deadening material 79.

The adjacent side edges of each of the panel sections 20A and 20B are provided with suitable inter-fitting or dove-tailing edges 80 and 81. The actual form of the edges 80 and 81 is immaterial and not a feature of the invention since any number of cooperating shapes may be employed. One of these surfaces is provided with a pair of spaced annular seals 82 and 83, which engages the surface of the cooperating dove-tail edge when said panel sections are contiguous and in their closed position for sealing acoustically.

*Pivotal Astragal*

Referring now to FIGURES 1 and 4, it will be noted that the slot 22 into the side of the storage chamber 19 is provided with a hinged closure member or astragal 90, which, when closed, engages the adjacent inner end of the panel section along its full length, and the spring urging means has sufficient pressure to urge the astragal 90 against the partition and sidewalls 86 and 88 of the slot 22 into an acoustical sealing arrangement. The astragal 90 has a hinged back plate 91 and angular spaced side members 92 and 93, which form an elongated medial slot that extends the full length thereof. The slot has an enlarged back section 96 and a reduced front section 98. A series of spaced coil springs 99 are mounted in vertically spaced relation on the inside of the back plate 91, and the springs 99 have a smaller plate 101 mounted across their front sides, which is of a size and shape to fit slidably within the enlarged back section 96. A block 103 is mounted forwardly of the plate 101, which is of a size and shape in cross-section to fit slidably within the reduced front section 98 of the slot, but is long enough to project forwardly therefrom. The forward end of the block 103 has a wider plate 106 mounted transversely thereof, which is slightly wider than the panel end of the partition, and is adapted to fit tightly thereagainst. It will press against the acoustical seal 74 and its sealing strips 76 and 78 on the back edge of the partition. The astragal 90 has acoustical seals 107 and 108 mounted on its opposite sides, which engage their respective wall sections 86 and 88 respectively, of the chamber 19 within the slot 22 for acoustically sealing the same. Each seal 107 and 108 is made up of suitably mounted spaced annular sealing strips. A suitable conventional pivotal fastening bar 110 and hasp 113 is provided for locking the astragal 90 in its closed position.

*The Panel Sections*

Figure 5:
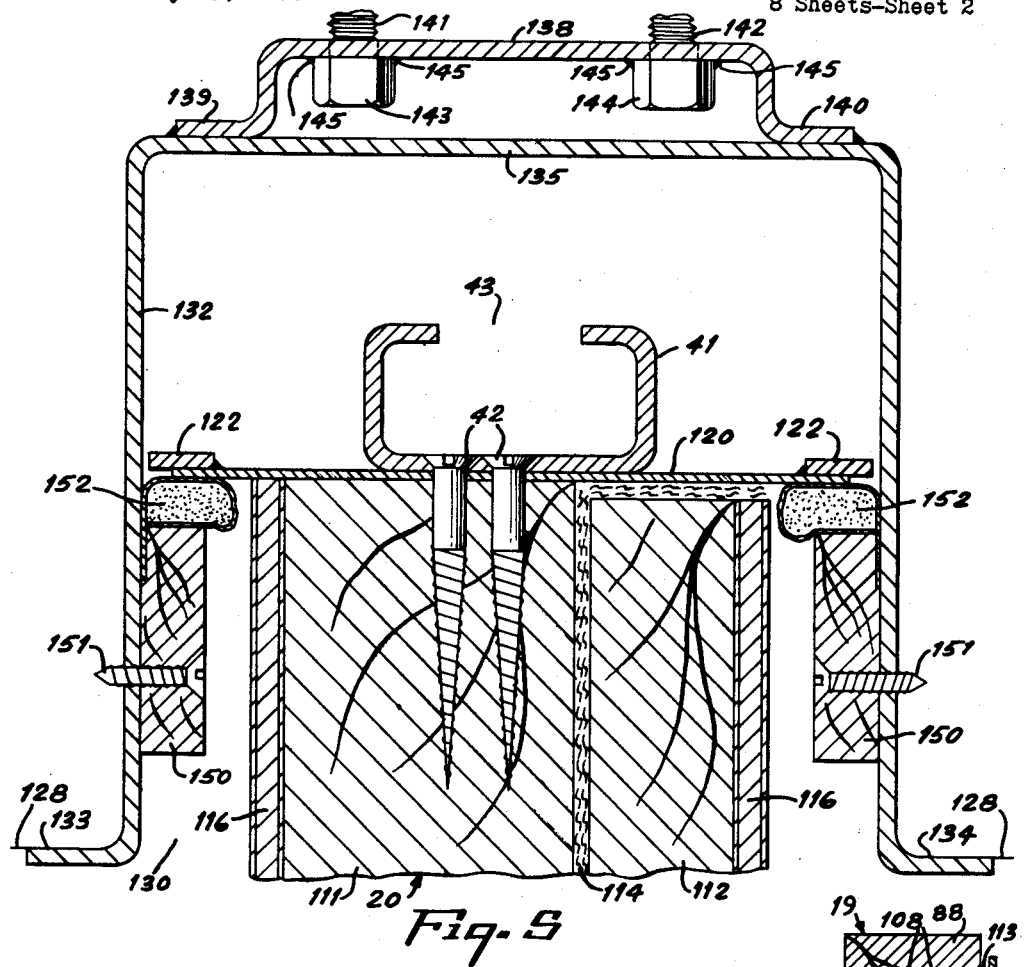
FIGURE 5 is an enlarged fragmentary elevational view of the top portion of a panel section, showing its acoustical sealing means in sealing position.

Referring to FIGURE 5, each panel section 20 of the sliding partition is made up of two wooden sections 111 and 112 separated by an acoustical strip 114, which may be made of felt or any other suitable substance, having sound-proofing properties. The acoustical features of the construction of each panel section 20 are shown in my United States Letters Patent No. 2,880,471, issued April 7, 1959. Each wooden section 111 and 112 of each panel 20 is faced with a suitable plywood panel 116, which is capable of being finished to match the finish in the room in which it is to be used.

There is mounted across the top of each panel section 20 a thin, flat, metal plate 120, which projects beyond the opposite sides of the partition panel and has relatively narrow and thin metal tabs 122 welded near the ends of each of its top edges, as best shown in FIGURE 5, which tabs 122 project slightly beyond the side edges of the plate 120. The plate 120 with its edge tabs 122, provide suitable means not only for guiding the top of the panel section 20 within its ceiling guide channel 130, but also to seal the same acoustically therein. The bottom edge of the panel section 20 is provided with a rollable member, which has spaced acoustical seals 125 and 127 mounted thereon.

*The Ceiling Channel*

The room to be equipped with a sliding partition constructed in accordance with the present invention is provided with a false or drop ceiling 128 (see FIG. 5) of conventional construction, which false ceiling 128 is provided with a recessed space 130 extending the length of the room and consisting of an inverted U-shaped housing 132, with integrally formed flange arms 133 and 134 extending outwardly from its lower sides. These arms 133 and 134 are adapted to extend under the outer surface of the ceiling 128 adjacent the recessed space 130. The base 135 of the U-shaped housing 139 has a series of longitudinally spaced inverted U-shaped bracket members 138 welded thereto by their flanged arms 139 and 140. The base of the bracket 138 is apertured for receiving conventional stringing rods 141 and 142 of the type used in the installation of false ceilings. The lower ends of the stringing rods 141 and 142, which are threaded, are mounted through the apertures in the brackets 138, and are secured fixedly thereto by nuts 143 and 144. The nuts 143 and 144 are welded, as indicated at 145, to the inner surface of the brackets 138 when the housing 132 is properly positioned so that there is no chance for them to loosen. The opposite ends of the stringing rods 141 and 142 are secured to the building structure, which is the floor or roof next above, in any conventional manner (not shown). The inverted U-shaped housing 132 is provided along opposite sides with attached wooden strips 150, which are secured by a series of longitudinally spaced screws 151. Mounted on the top or inner edge of the strips 150 are acoustical seals 152. The strips 150 and its seals 152 are mounted in such a position that, when the panel sections 20 of the sliding partition are lowered into its acoustical position on its floor trackway 24, the underside edges of the plate 120 will snugly press against the sealing strips 152, thereby sealing acoustically the top edge of the partition.

*The Main Floor Trackway*

There is illustrated in FIGURES 6 and 7 not only the construction of the main floor trackway 24 but also the construction of the spaced rollable supporting units 186 of each panel section 20.

Referring first to FIGURE 6, there is shown a floor 160, having an elongated channel 161 formed as an open top recess therein. The bottom of the channel 161 has a base plate 162, angular side plates 163 and 164, which define the same. The arms of the side plates 163 and 164 are welded, as indicated at 166, to the base plate 162.

Mounted on the top side of the base plate 162 of the elongated channel 161 is a series of longitudinally spaced ramps or wedges 168, which form ramps. These ramps 168 are secured fixedly to the base plate 162 by spaced screws 170.

Within the channel 161 and above the ramps 168 is a panel section supporting trackway 24 which is movable or shiftable longitudinally of said channel 161 for a very short distance, which distance is slightly greater than the length of said ramps. This trackway 24 consists of a top supporting metal bar 172, having a medial recess or groove 174 in its top plane. Side plates 176 and 177 depend in alignment from the bar 172, and are welded fixedly thereto. Each of the side plates 176 and 177 is apertured, as indicated at 178 and 179, respectively. A shaft 180 is extended through said aligned apertures and through said side plates. The shaft 180 carries a roller bearing wheel 182 of conventional construction. When the supporting trackway 24 is moved longitudinally of the channel 161, the rollers 182, which are spaced between the ramps 168 will roll-up or ride-down said ramps 168, depending upon the direction in which the supporting trackway 24 is being shifted.

Figure 10:
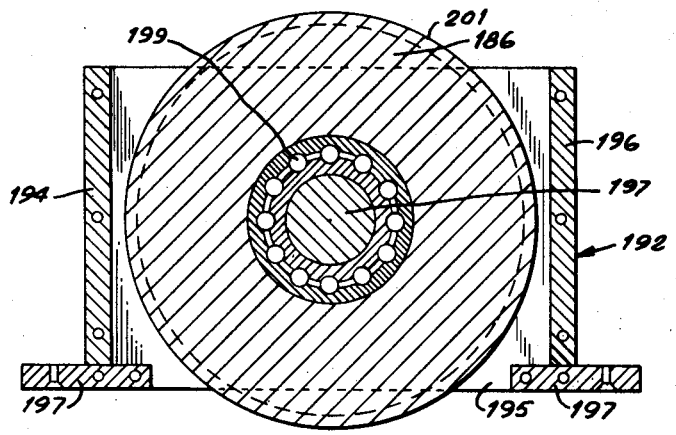
FIGURE 10 is an enlarged vertical sectional view of one of the supporting wheels of a panel section, showing the details of its housing.

There are shown in FIGURES 2, 6 and 10 the wheels 186 which form the rollable units or means for each panel section 20. In FIGURE 2, it will be noted that each panel section 20 is equipped with two longitudinally spaced wheel units, which have been mounted within the bottom edge of the panel section 20 in such manner that only a small arcuate segment of its periphery projects therebelow. Referring now to FIGURE 6, there is shown in detail the construction and mounting of one of said wheels 186 within the lower bottom edge of the panel section 20. The bottom edge of the panel sections 20 is recessed to receive a metal housing 192, which has vertically extending side and end walls lining the same. In FIGURE 10, it will be noted that the lower edges of the end walls 194 and 196 have base plates 197 which extend outwardly and are apertured to provide means for fastening the same to the bottom edge of the panel section 20 by means of screws (not shown).

The housing 192 has metal side plates 193 and 195 extending parallel with the sides of the panel 20. The plates 193 and 195 are apertured axially to receive a shaft 197 equipped with roller bearings 199. The wheel 186 is rotatably mounted on the shaft 197, and has an integral formed circumferentially extending radial flange 201 which is adapted to ride in the groove 174 of the track bar 172 forming the trackway 24 of the main room being equipped with a partition.

Operation of the Trackways

Figure 11:
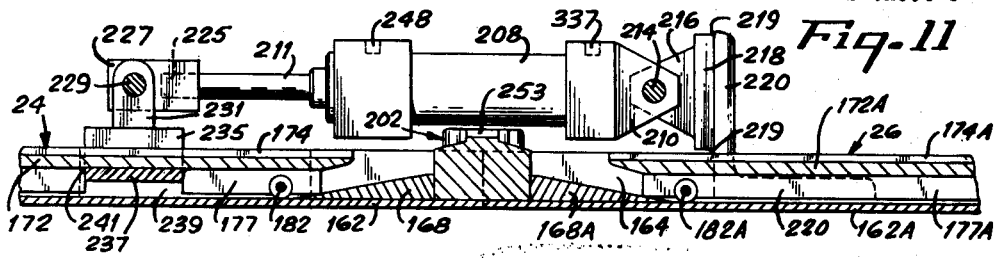
FIGURE 11 is a fragmentary longitudinal vertical sectional view of the hydraulic actuating means shown in FIGURE 12 for actuating the main floor trackway, which is shown in its lowered or acoustical sealing position, the same having been taken substantially along the line 11—11 thereof, looking in the direction of the arrows.
Figure 12:
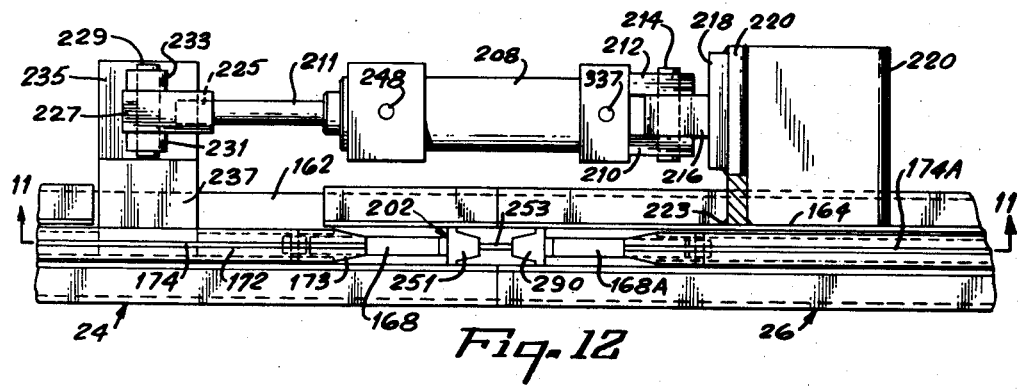
FIGURE 12 is a top plan view of the actuating means shown in FIGURE 11 and showing the details of the cross-over saddle.

There is shown in FIGURES 11 and 12 the operating mechanism for raising and/or lowering the main floor trackway 24, which is shown on the left side only of FIGURES 11 and 12 in its lowered position, whereby its grooved track 174 remains flush with the floor 160 in which it is mounted. The trackway 26 shown to the right of FIGURES 11 and 12 is the trackway of the storage room 19. There is no direct connection between the storage room trackway 26 and the main room trackway 24 except through a cross-over saddle 202, as will be hereinafter more fully explained.

The two top supporting metal bars 172 and 172A substantially meet and are aligned by means of the cross-over saddle 202, which has a short intermediate stationary section of trackway or groove 253 on a level which remains at all times in the plane of the raised trackways 24 and 26.

The right end of the cylinder 208 has a pair of spaced arms 210 and 212 projecting outwardly therefrom, which are apertured laterally to receive a shaft 214. Mounted between the arms 210 and 212 and pivotally of the shaft 214 is a triangularly shaped bracket 216, which, in turn, is welded to a plate 218. The plate 218 has its opposite side welded, as indicated at 219, to a vertical arm of an angular bracket 220. The horizontal arm of the angular bracket 220 is, in turn, welded, as indicated at 223, to the side 164 of the stationary floor channel 161 in the storage room trackway 26.

The cylinder 208 has an operating piston 209 (shown in FIG. 15), which has a piston rod 211 projecting outwardly of its left end. The piston rod 211 has its outer projecting end threaded into a recess 225 in a block 227, which, in turn, is apertured to receive a shaft 229. The shaft 229 is suitably mounted between a pair of spaced upstanding arms 231 and 233, which, in turn, have their lower ends welded to the upright section 235 of an angular bar whose horizontal arm 237 passes through a slot 239 in the side 164 of the channel housing of the main floor trackway 24. The arm 237 has its inner end welded, as indicated at 241, to the underside of the floor track bar 172, which means that when the arm 237 is moved the floor track bar 172 will be moved with it.

The floor track bar 172 is shown in its lowermost position with its wheels 182 riding on the base plate 162 of the floor channel 161. When oil is forced into the cylinder 208 through the port 248, the piston 209 will be moved from left to right within the cylinder 208, thereby withdrawing the piston rod 211, which, in turn, will through the pivotal brackets 227, 231, 235 and 237 pull the track bar 172 from left to right, causing its wheels 182 to ride up the ramps 168. It will be noted in FIGURE 12 that the forwardly projecting end of the track bar 172 is tapered and truncated, as indicated at 173, and is the exact shape of the guide channel 251 on the top of the cross-over saddle 202. The guide channel 251 serves to align the sliding track bar 172 and its medial groove 174 with the groove 253 formed on the top middle section of the saddle 202. When the track bar 172 is in its raised position, the panel sections 20 will move along the groove 174 of the main floor track bar 172 into the cross-over saddle groove 253, whereupon they are in a position to be moved further forwardly into the aligned track 172A of the storage chamber 19.

When oil in the hydraulic system is forced into the cylinder 208 through the inlet port 337, the piston 209 will be moved or pushed backwardly, which is from right to left in the drawings, and the piston rod 211 through the pivotal brackets 227, 231, 235 and 237 will push the track 172 off the ramps 168 until the wheels 182 again ride on the base plate 162, whereupon the track bar 172 will be lowered, dropping the panel sections 20A and 20B (FIG. 4) into their acoustical sealing position, as best shown in FIGURE 6. The cylinder 208 and its piston rod 211 are mounted pivotally so as to permit vertical movement during the raising and/or lowering of the track bar 172.

Figure 13:
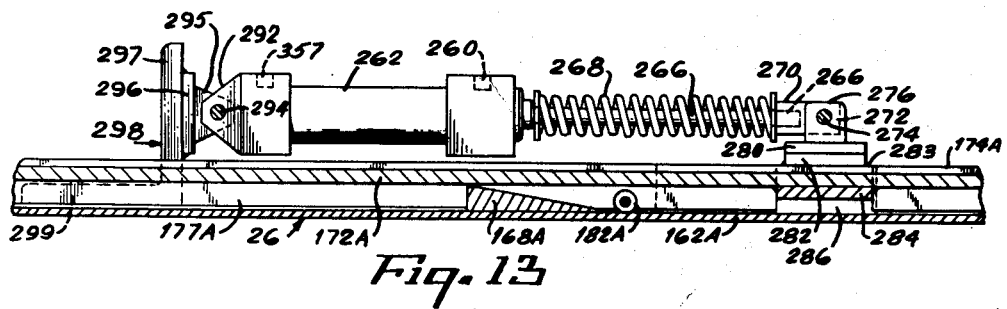
FIGURE 13 is a fragmentary longitudinal vertical sectional view of the hydraulic actuating means shown in FIGURE 14, for operating the storage chamber trackway, the same being shown in its lowered position, this view being taken substantially along the line 13—13 of FIGURE 14, looking in the direction of the arrows.
Figure 14:
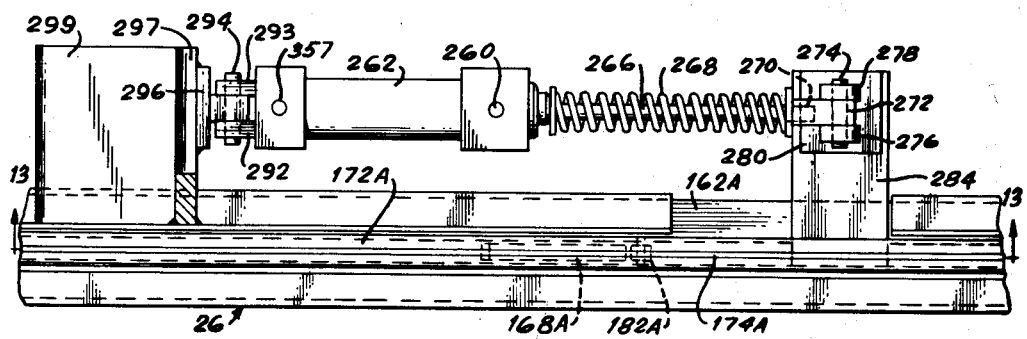
FIGURE 14 is a top plan view of the hydraulic actuating means shown in FIGURE 13.

Referring now to FIGURES 13 and 14, there is shown the operating mechanism for raising and/or lowering the floor trackway 26 in the storage chamber 19, which is best shown in FIGURE 2. This trackway 26, it will be noted, is short and but slightly longer than the width of a single panel section. It is provided with a series of longitudinally spaced ramps 168A at intervals of approximately eighteen inches. These ramps 168A are identical in size and shape to the ramps 168 in the main floor trackway 24. While only one ramp 168 is shown and described in detail in the main floor trackway channel 161, there is a series of them shown diagrammatically in FIGURE 2. The ramps 168 extend the entire length of the main floor trackway 24 at regularly spaced intervals of approximately eighteen inches.

Since the storage room trackway 26 is relatively short, hydraulic operating pressure is not required to lower its track bar 172A, but the lowering may be readily accomplished by suitable spring urging means mounted around the piston rod of the piston of its operating cylinder, which is mounted on the opposite end of the trackway from the cross-over saddle 202.

The track bar 172A is identical in construction, except for length, with the main floor track bar 172, and is provided with a series of longitudinally spaced ramps 168A. It is provided with a medial groove 174A, which, when the track bar 172A is moved to its raised position, will abut and be aligned with the groove 253 in the cross-over saddle. Manifestly, when both track bars 172 and 172A are moved to their raised positions, each will abut and be aligned with the opposite ends of the cross-over saddle 202 and their respective grooves 174 and 174A which meet with the saddle groove 253, providing a continuous track for the wheel flanges 201 of the panel sections 20, 20A, 20B and/or 20C.

When the oil is forced into the port 260 of the cylinder 262, it pushes the piston 264 forwardly, which is from right to left in the drawings. When the piston 264 is moved forwardly, it draws the piston rod 266 inwardly, compressing the coil spring 268. The outer end of the piston rod 266 is threaded into a recess 270 in a bar 272, which, in turn, is apertured for mounting pivotally on a shaft 274. The shaft 274 is secured between spaced arms 276 and 278. The lower ends of the arms 276 and 278 are welded on a plate 280 which, in turn, is welded to a second plate 282. The second plate 282 is welded, as indicated at 283, to a third plate 284, which extends horizontally through a slot 286 into the channel of the storage room trackway 26.

The opposite or left end of the cylinder 262 has two spaced longitudinally extending arms 292 and 293 projecting therefrom, which are apertured transversely adjacent their outer ends to receive a shaft 294. An arm 295 is fastened to the shaft 294 between the two arms 292 and 293, which has its outer end welded to a vertical plate 296 that is in turn welded to the vertically extending arm 297 of an angular plate 298, whose horizontally extending arm 299 is in turn welded to the plate 164A of the floor channel 26. The cylinder 262 is obviously suitably anchored at the end opposite that from which its piston rod 266 projects. The arms 292 and 293 are mounted to pivot about the shaft 294, which will permit the cylinder 262 to pivot about the shaft 294 when its track bar 172A is being either raised or lowered.

Obviously, when the piston rod 266 is withdrawn within its cylinder 262, the plate 284, which is welded to the underside of the track bar 172A will be moved within the slot 286 against pressure of the coil spring 268. Whereupon, the rollers 182A will be moved up and over the top surface of the ramps 168A, thereby raising the track bar 172A. It will be noted in FIGURE 12 that the forward end of the track bar 172A is truncated like the forward end of the track bar 172, and as it moves into its raised position it will be moved into the truncated slot 290 on the top of the cross-over saddle 202. When the track bar 172A is in this raised position, the forward end of its groove 174A will abut and be aligned with the adjacent end of the cross-over saddle groove 253, forming a continuous trackway therewith for the flanges 201 of the wheels 186 of the panel sections 20.

When it is desired to lower the storage room track bar 172A, it is only necessary to release the pressure on the oil in the cylinder 262 and the oil will return to its storage tank. The coil spring 268 now has sufficient spring urging means to withdraw the piston rod 266 and its connected track bar 172A to its extended and lowermost position.

*Schematic Drawings of the Hydraulic Operating System*

There is shown in FIGURES 15, 16 and 17 the details of the hydraulic system for the main floor track bar 172 and the storage chamber track bar 172A. These schematic drawings of FIGURES 15, 16 and 17 have been made in accordance with the hydraulic format approved by the Joint Industrial Congress (J.I.C.), Hydraulic Standards for Industrial Equipment, as adopted and revised March 20–22, 1957.

*The Main Floor Trackway*

The hydraulic system for pulling and raising the main floor track bar 172 and for pushing and dropping it back to the floor level, and also for pushing and raising the storage chamber track bar 172A comprises the following parts:

A storage tank 301 supplies oil to a connecting pump unit 302, which is manually operable by a pump handle 306. The storage tank 301 may be filled by removing the plug 303. When pressure is applied to the oil in the pump 302 by operation of the pump handle 306, it is forced under pressure into the pipe line 308, through the T 310, into the pipe line 311, through the check valve 312, pipe line 313 and into the four-way directional valve 314. When the valve 314 is in manual (Man.) position 315, the oil is passed into the pipe line 316, through the flexible hose 318 and into the port 248 on the left side of the hydraulic cylinder 208, whereupon it will push its piston 209 from left to right, thereby retracting the piston rod 211, which, in turn, is connected to the main room trackway 24. The rollers 182 of the main room track bar 172 are pulled up the spaced ramps 168, and its forward end enters the cross-over saddle 202.

The four-way valve 314 may be moved to position 317, which is its "hold" or neutral position. While the four-way valve 314 is in its neutral position 317, it is possible to operate the storage chamber valve 344 for pulling or raising the storage chamber track bar 172A.

When the four-way valve 314 is moved to its detent (Det.) position 319, the flow of oil in the system will be reversed. By operating the pump handle 306 with the valve 314 in its detent (Det.) position 319, the oil will be forced into the pipe line 334, through the flexible hose 336 and into the right side of the cylinder 208 through the port 337 thereby forcing its piston back, or from right to left. This action forces the oil out of the left side of the cylinder 208 through the port 248 into the flexible hose 318, pipe line 316, four-way valve 314, whereupon it will be diverted into the pipe line 339, passing through the orifice block 338, through the cross 340 and back into the storage tank 301. The flexible hose lines 318 and 336 are essential since the cylinder 208 will pivot vertically with the raising and lowering of the main floor track bar 172.

*The Storage Room Trackway*

With its three-way valve 344 set for manual position 345, operation of the pump handle 306 will cause oil to flow from the pump 302 into the pipe line 308, T 310, pipe line 346, through the check valve 348 and then into the three-way valve 344. From the three-way valve 344, the oil is diverted into the pipe line 350, through the flexible hose 352 and into the right side of the cylinder 262 through the port 260. This force of oil will cause the piston 264 to move from right to left, pulling or retracting its piston rod 266, whose outer end is connected to the track bar 172A in the storage chamber 19. The storage track bar 172A is accordingly pulled up the ramps 168A, being raised into its receiving position on the cross-over saddle groove 253.

When the three-way valve 344 is moved to its neutral position 347, the system will hold and remain in a status quo position. However, when the three-way valve 344 is moved manually into its detent (Det.) position 349, for lowering the storage floor track 172A, the pressure on the oil is released and it returns into the flexible hose 352, pipe line 350, three-way valve 344, whereupon it is diverted into the pipe line 356, cross 340 and back into the storage tank 301. The return flow of oil is caused by spring urging pressure of the coil spring 268 mounted over the piston rod 266, and thereby pushing the storage track bar 172A off the ramps 168A for lowering the same.

In the event there is any leakage of oil past the piston 264 from the pressure side of the cylinder 262, such oil will flow out of the cylinder 262 through a port 357, into the flexible hose 358, through the pipe line 360, the cross 340 and back into the storage tank 301.

Figure 19:
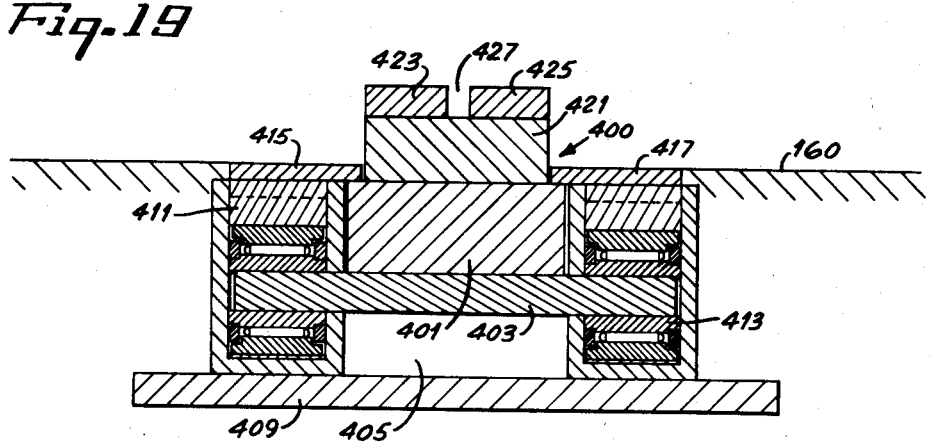
FIGURE 19 is a fragmentary cross-sectional vertical view of the modified form of floor trackway shown in FIGURE 18, the same having been taken substantially along the line 19—19 thereof, looking in the direction of the arrows.
Figure 18:
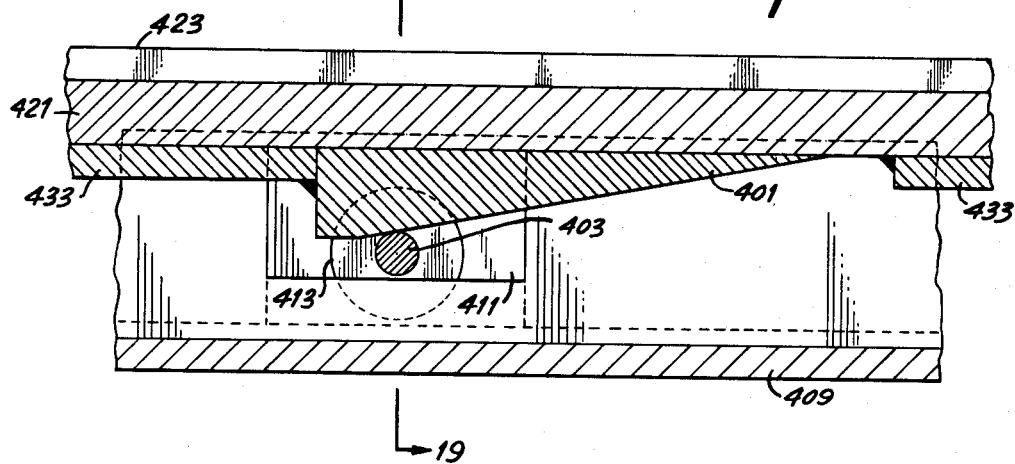
FIGURE 18 is a fragmentary longitudinal vertical sectional view of a modified form of floor trackway, wherein movable ramps operate over stationary roller bearing shafts.

*Modification of Trackway Shown in FIGURES 18 and 19*

Referring now to FIGURES 18 and 19, there is shown a modified form of floor trackway 400, wherein the ramps or wedges 401 ride up and down rotatable shafts 403 mounted in the floor channel 405 in a conventional floor 160.

In this arrangement, the floor channel 405 is provided with a base plate 409 and has a series of longitudinally spaced pairs of spaced bearing boxes 411 and 413 mounted therein along opposite sides of said channel 405. A series of longitudinally spaced rotatable shafts 403 extend across said channel 405 with their opposite ends suitably journalled in said bearing boxes 411 and 413. A removable pair of transversely spaced top cover strips 415 and 417 extend longitudinally of the channel 405 and cover said bearing boxes 411 and 413. These cover strips 415 and 417 lie in the plane of the floor 160.

There is mounted in the recess between said spaced cover strips 415 and 417 a main track 421, which consists of a solid bar of metal, having two spaced relatively narrow bars 423 and 425 mounted on its top side. The space 427 between said bars 423 and 425 provides a suitable groove or track for the flanges 201 of the rollable members 182 of the panel sections 20.

A series of longitudinally spaced ramps or wedges 401 are mounted on the bottom of the trackway 421 in any suitable manner, as by welding, screws, etc. (not shown). These wedges or ramps 401 are slightly wider than the track 421 so that their edges extend under the adjacent sides of the cover strips 415 and 417, thereby preventing the track 421 from raising entirely out of the floor channel 405. The shafts 403 and ramps 401 are spaced correspondingly to the rollers 182 and ramps 168 previously described. It will be noted that a stop bar 433 is mounted on the underside of the track 421 with one end abutting the larger end of the ramps 401. This bar 433 provides additional support for securing the ramps 401 against longitudinal movement under pressure.

When the track 421 is moved longitudinally of the floor channel 405, the sloping bottom of each ramp 401 will ride up and/or down its respective rotatable shaft 403, thereby raising and/or lowering the track out of and/or into the floor channel 405. In FIGURES 18 and 19, the track bar 421 is shown in its raised position extending slightly above the plane of the floor 160, since the thickest portion of each ramp 401 is engaging the shaft 403. When the track 421 is shifted to its lowermost position, the shaft 403 will not be engaging any part of the ramps 401, but will be at rest between them.

*Modified Panel Sections Having Retractable Wheels*

Referring now to FIGURES 20 and 21, there is shown a modification of the invention wherein the wheel members of the panel sections are made retractable and projectionable, whereby the partitions may be used in connection with a fixed floor trackway. In this modification, when the wheel members are retracted, the panel sections rest on the floor trackway with their top and bottom edges sealed acoustically. When the wheel members are projected, the partitions are raised above the floor trackway and above the acoustical seals in the ceiling channel, and may be easily rolled along said trackway.

The panel section 20C is identical in construction with the panel sections 20, 20A and 20B except for the retractable wheel members 500, which are mounted in suitable recesses in the bottom edge thereof, and the main floor trackway 502 is fixedly mounted on the top of the floor 160.

The floor trackway 502 consists of a metal rail member 504, which is provided with a groove 507, extending along its top surface longitudinally thereof. The rail member 504 is flanked on opposite sides by wooden boards 506 and 508. The width of the trackway 502 is slightly greater than the width of the panel sections 20C so that the bottom acoustical seals 510 and 511 may be engaged when its wheels are retracted.

The recesses in the bottom edge of the panel section 20C are lined with a metal casing 512, which is apertured on opposite sides intermediate its ends, as indicated at 516, to receive a cam shaft 518. The cam shaft 518 is provided with a roller bearing member 520. Mounted concentrically on the roller bearing member 520 is a metal wheel 522, which has a peripheral flange 524 adapted to operate within the groove 507 of the main floor trackway 502.

It will be noted that the cam shaft 518 is provided with an eccentric recess 526, which may be of any suitable shape except circular in cross-section. There is provided in the door panel members 116 and 111 an aperture 528 that is in axial alignment with the eccentric recess 526 in the cam shaft 518. The aperture 528 is provided with a flange plate 530 on the outer side 116 of the panel section 20C.

A suitable crank 532 is provided for operating the retraction and projection of the wheels 522, which can be withdrawn and removed when not in use. The crank 532 has a cross-section that fits slidably into the eccentric recess 526. Whereupon, when said crank 532 is rotated, the opposite end of the same, which is engaged in the eccentric recess 526, will rotate the cam shaft 518, causing it to raise or lower its concentrically mounted wheel 522, depending upon the position of the eccentric recess 526 with respect of the aligned aperture 528.

There is shown in FIGURE 21, a fragmentary view of the bottom part of the panel section 20C with its wheel 522 projected by merely rotating the crank 532 through an arc of 180 degrees. In this position, it will be noted that the wheel 522 has been projected out of its recess in the bottom of the panel section 20C, whereby said panel section is raised off the floor trackway 502, whereupon it may be rolled into storage and/or partitioning position with its bottom acoustical seals free of contact with the main floor trackway 502. It will also be noted that in the raised position, which is shown in FIGURE 3, the top plate 120 carried by the top edge of the panel section 20C will also be raised out of engagement or contact with the acoutical seals 152 secured in the ceiling channel housing 135.

*Operation of the Sliding Partition*

It will be appreciated from the foregoing description that the operation of the various parts has been completely explained, and need not be repeated again. However, it must be realized that the main room track bar 172 need be raised only once to permit movement of all of the panel sections into their final position, but that the storage room track bar 172A, being only slightly longer than the width of a single panel section, must be raised and lowered for the storage or removal of each panel section to be moved onto or removed from the room trackway 24.

When a panel section 20 is moved into the storage chamber 19, its track bar 172A must be raised to receive said panel section, which, in turn, holds it high enough for its top sildable hanger member 41 to be telescopically fitted over the T-bar 39 that is in vertical alignment with the floor track bar 172A. When the hanger 41 has been telescoped onto said T-bar 39, the track 172A may be lowered, thereby causing said panel section 20 to be suspended on said T-bar 39.

With the panel section 20 suspended on the T-bar 39, the changer-rack with its spaced T-bars 39 may now be moved one position, or until its next succeeding T-bar 39 is aligned vertically with the storage chamber track 172A. The changer-rack is now ready to receive the next succeeding panel section 20, but before said panel section can be moved into the storage chamber 19, its floor track 172A must be raised into receiving position. Movement of the T-bars 39 into and out of alignment with the storage chamber track 172A is done by manipulating the chain 60, as previously described.

It will be obvious that to remove the panel sections 20 from their suspended position on the T-bars 39 of the changer-rack, the reverse steps must be taken in order to move such panel sections into the room. Otherwise, the operations are the same.

Although I have described in detail and illustrated in the drawings but a few modifications which the invention may assume, it will be readily apparent to those skilled in the art that the same need not be so limited, but that various other modifications may be made therein without departing from the spirit thereof.

What I claim is:

1. In a sliding partition of the character described consisting of a plurality of individual panel sections, each panel section having spaced rollable supporting wheels mounted in its base, each panel section having a hanger clip extending upwardly from its top edge, a vertically aligned main floor trackway and an overhead guide channel in a room to be partitioned, a separate storage chamber having a floor trackway aligned with one end of said main floor trackway, said floor trackways each having a supporting section capable of being raised and lowered, means for separately raising and lowering said supporting trackway sections, said storage room having spaced supporting rails extending transversely of said storage room floor trackway, a series of movable stacking rails suspended below said supporting rails and out of alignment with said storage room trackway, means for moving said stacking rails successively into and out of alignment with said storage room trackway whereby when a panel section is in its raised position its hanger clip will slidably engage said aligned stacking rail, means for lowering said storage room floor trackway to suspend said panel section on said stacking rail whereupon it can be moved transversely of said floor trackway.

2. In a sliding partition of the character described consisting of a plurality of individual panel sections, each panel section having spaced retractable rollable supporting wheels mounted in its base, each panel section having a hanger clip extending upwardly from its top edge, a vertically aligned main floor trackway and an overhead guide channel in a room to be partitioned, a separate storage chamber having a floor trackway aligned with one end of said main floor trackway, said storage room having spaced supporting rails extending transversely of said storage room floor trackway, a series of stacking rails mounted movably below said supporting rails and out of alignment with said storage room trackway, means for moving said stacking rails successively into and out of alignment with said storage room trackway whereby when said panel section is in its raised position its hanger clip will slidably engage said aligned stacking rail, means for retracting said rollable supporting wheels to lower said panel section to suspend it on its aligned stacking rail whereby said stacking rail and its depending panel section may be moved transversely of said floor trackway into storage.

3. In a movable partition of the class described for dividing an enlarged closed area between ceiling and floor into smaller sections acoustically sealed from one another, the combination of a ceiling channel and a floor channel in vertical alignment, said ceiling channel having a closed top and depending sides, said sides having acoustical seals extending longitudinally thereof spaced from said closed top, said floor channel having a floor trackway for moving a series of panel sections thereover, with their tops extending into said ceiling channel, said panel sections having interlocking sides provided with spaced acoustical seals, the tops of each panel section within said ceiling channel carrying means for engaging said channel seals, said panel sections each having rollable members mounted within their bottoms for engaging said floor trackway and acoustical seals extending along said bottom on opposite sides of said rollable members, and means for raising and lowering said panel sections whereby when said panel sections are lowered said top panel means will acoustically engage said channel seals and said bottom seals will acoustically engage said floor.

4. In a movable partition of the class described for dividing an enlarged closed area between ceiling and floor into smaller sections acoustically sealed from one another, the combination of a ceiling channel and a floor channel in vertical alignment, said ceiling channel having a closed top and depending sides, said sides having acoustical seals extending longitudinally thereof spaced from said closed top, said floor channel having a floor trackway for moving a series of panel sections thereover with their tops extending into said ceiling channel, said panel sections having interlocking sides provided with spaced acoustical seals, the top of each panel section within said ceiling channel carrying means for engaging said channel seals, said panel sections each having rollable members mounted within their bottoms for engaging said floor trackway and acoustical seals extending along said bottoms on opposite sides of said rollable members, and means for raising and lowering said floor trackway within said floor channel, whereby when said panel sections are being lowered said top panel means will engage said channel seals and said bottoms seals will acoustically engage said floor and when said floor trackway is raised in said floor channel said panel sections may be moved therealong with said seals being out of acoustical engagement.

5. In a movable partition of the class described for dividing an enlarged closed area between ceiling and floor into smaller sections acoustically sealed from one another, the combination of a ceiling channel and a floor channel in vertical alignment, said ceiling channel having a closed top and depending sides, said sides having acoustical seals extending longitudinally thereof spaced from said closed top, said floor channel having a floor trackway for moving a series of panel sections thereover with their tops extending into said ceiling channel, said panel sections having interlocking sides provided with spaced acoustical seals, the top of each panel section within said ceiling channel carrying means for engaging said channel seals, said panel sections each having rollable members mounted within their bottoms for engaging said floor trackway and acoustical seals extending along said bottoms on opposite sides of said rollable members, and means for retracting said rollable members within the bottoms of said panel sections to lower said panel sections within said ceiling channel whereby said top panel means will engage said channel seals and said bottom seals will acoustically engage said floor.

6. In a sliding partition of the character described, consisting of a plurality of individual panel sections, each panel section having spaced rollable supporting wheels mounted in its base, each panel section having a hanger clip extending upwardly from its top edge, a vertically aligned main floor trackway and an overhead guide channel in a room to be partitioned, a separate storage chamber having a floor trackway capable of being raised and lowered, means for raising and lowering said trackway, said storage trackway being in alignment with said main floor trackway when in its raised position so that said panel sections may be moved back and forth, said storage room having spaced supporting rails extending transversely thereof and above said floor trackway, a series of movable stacking rails suspended below said supporting rails and out of alignment with said storage room trackway, means for moving successively said stacking rails into alignment with said storage room trackway, whereby said storage room trackway may be lowered to suspend said panel sections by its hanger clip on its aligned stacking rail and said stacking rail with its depending panel section may be moved transversely of said storage room floor trackway into storage.

7. In combination with a ceiling channel having a closed top, closed downwardly depending sides, an open bottom for receiving a top of a panel section of a sliding partition and spaced acoustical seals extending one each longitudinally along the sides of said ceiling channel spaced from said top, a panel section of a sliding partition having a top extending into said ceiling channel, said top of said panel section having laterally extending sealing means for engaging said channel seals, said panel sections being capable of being raised and lowered within said ceiling channel whereby when said panel section is raised its sealing means do not engage said channel seals and when said panel section is lowered its sealing means engage acoustically said channel seals.

References Cited in the file of this patent
UNITED STATES PATENTS

| | | |
|---|---|---|
| 1,635,926 | Conrad | July 12, 1927 |
| 1,893,147 | Oberdorfer et al. | Jan. 3, 1933 |
| 1,901,304 | King | Mar. 14, 1933 |
| 2,151,033 | Jones | Mar. 21, 1939 |
| 2,225,679 | Beauchamp | Dec. 20, 1940 |
| 2,945,535 | Haws | July 19, 1960 |
| 3,019,920 | Hillenbrand et al. | Feb. 6, 1962 |

FOREIGN PATENTS

| | | |
|---|---|---|
| 739,303 | France | Oct. 25, 1932 |